(12) United States Patent
Bent, III et al.

(10) Patent No.: US 10,963,916 B2
(45) Date of Patent: Mar. 30, 2021

(54) SYSTEMS AND METHODS FOR ASSESSING ADVERTISEMENT

(71) Applicant: Google LLC, Mountain View, CA (US)

(72) Inventors: Sylvanus Garnet Bent, III, Palo Alto, CA (US); Prahlad Fogla, Sunnyvale, CA (US); Jamie Nicole Powell, Los Altos, CA (US); Shu Niu, Palo Alto, CA (US); Nam Hoang Mai, Los Altos Hills, CA (US); Tristan Dennen, Santa Clara, CA (US); Sean Burroughs Johnston, Mountain View, CA (US); Siva Kumar Gorantla, Sunnyvale, CA (US); Suzanna Whiteside Shwert, San Jose, CA (US); Maxwell Schram, San Francisco, CA (US); Weikun Liang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/760,621

(22) PCT Filed: Sep. 16, 2019

(86) PCT No.: PCT/US2019/051363
§ 371 (c)(1),
(2) Date: Apr. 30, 2020

(87) PCT Pub. No.: WO2020/060949
PCT Pub. Date: Mar. 26, 2020

(65) Prior Publication Data
US 2020/0402098 A1 Dec. 24, 2020

Related U.S. Application Data

(60) Provisional application No. 62/732,487, filed on Sep. 17, 2018.

(51) Int. Cl.
*G06N 7/00* (2006.01)
*G06Q 30/02* (2012.01)
(Continued)

(52) U.S. Cl.
CPC ....... *G06Q 30/0256* (2013.01); *G06F 40/284* (2020.01); *G06N 3/049* (2013.01); *G06N 7/005* (2013.01); *G06Q 30/0244* (2013.01)

(58) Field of Classification Search
CPC ...................................................... G06N 7/00
(Continued)

(56) References Cited

U.S. PATENT DOCUMENTS 8,793,158 B2  7/2014  Wee et al.
2003/0088562 A1  5/2003  Dillon et al.
(Continued)

OTHER PUBLICATIONS

Examination Report for EP Appln. Ser. No. 19863874.4 dated Jul. 28, 2020 (8 pages).
(Continued)

*Primary Examiner* — David R Vincent
(74) *Attorney, Agent, or Firm* — Foley & Lardner LLP

(57) ABSTRACT

Systems and methods are disclosed for dynamically analyzing and providing the quality of one or more content items at the time, or substantially close to the time, they are received by a data processing system. The systems and methods described herein can maintain and update the quality score for improving previously created content items after they have been published. The one or more content items can include one or more assets (e.g., one or more headlines, one or more descriptions, images, video, etc.). The data processing system can use numerical analysis methods to determine an overall quality (e.g., estimated clicks) of the content items received by the data processing system using a trained model.

20 Claims, 6 Drawing Sheets

(51) Int. Cl.
*G06F 40/284* (2020.01)
*G06N 3/04* (2006.01)

(58) Field of Classification Search
USPC .................................................. 706/15, 45
See application file for complete search history.

(56) References Cited

U.S. PATENT DOCUMENTS

| | | |
|---|---|---|
| 2006/0277102 A1 | 12/2006 | Agliozzo |
| 2007/0288454 A1 | 12/2007 | Bolivar et al. |
| 2008/0243820 A1 | 10/2008 | Chang et al. |
| 2008/0249855 A1 | 10/2008 | Collins et al. |
| 2014/0244631 A1 | 8/2014 | Arthur et al. |
| 2016/0035082 A1 | 2/2016 | King et al. |
| 2018/0121430 A1 | 5/2018 | Kagoshima et al. |

OTHER PUBLICATIONS

International Search Report and Written Opinion for PCT Appln. Ser. No. PCT/US2019/051363 dated Jan. 21, 2020 (12 pages).
Written Opinion and International Searching Authority on PCT PCT/US2019/051363 dated Jan. 21, 2020.
First Office Action for CN Appln. Ser. No. 201980005505.8 dated Oct. 16, 2020 (11 pages).

SYSTEMS AND METHODS FOR ASSESSING ADVERTISEMENT

CROSS-REFERENCE TO RELATED APPLICATIONS

The present application is a National Stage Application, filed under 35 U.S.C. 371, of International Patent Application No. PCT/US2019/051363 filed on Sep. 16, 2019 titled "SYSTEMS AND METHODS FOR ASSESING ADVERTISEMENT," which in turn claims priority to USSN 62/732487 titled "SYSTEMS AND METHODS FOR ASSESING ADVERTISEMENT," the entireties of which are incorporated by reference herein.

BACKGROUND

In a computer networked environment such as the Internet, third-party content providers provide content items for display on end-user computing devices. These third-party content items, for example, advertisements, can be linked to web pages associated with the third-party content providers. These third-party content items can include content identifying the third-party content provider that provided the content item.

SUMMARY

One technical issue addressed by the present disclosure is the difficulty in determining the number of interactions a content item may receive without first publishing the content item. For example, a content provider may wish to know the number of clicks that a content item may receive in order to understand the impact of word choice in a content item. However, simply publishing the content item and gathering data after the fact may be costly to the content provider, and the content provider may wish to know the projected impact of a content item campaign before the campaign is launched. The challenges addressed in this disclosure relate to assessing the estimated quality (e.g. number of interactions) third party users may have with a content item provided by a content provider. The systems and methods in the present disclosure can calculate, based on numerical data gathered from analyzing assets (e.g., text, images, video, etc.) provided by the content provider, the estimated quality of content items generated using the text strings and the target keywords.

At least one aspect of the present disclosure is directed to a method of assessing content items using numerical criteria. The method can include receiving, by an asset reception module, a plurality of text strings. Each of the plurality of text strings can include a token. The method can include receiving, by the asset reception module, a plurality of target keywords. The method can include retrieving, by an asset analysis module, one or more synonyms and one or more root words for each token in each of the plurality of text strings from a database. The method can include, for each of the plurality of text strings, selecting, by the asset analysis module, a first text string from the plurality of text strings. The method can include, for each of the plurality of text strings, determining, by the asset analysis module, the number of matching tokens in the first text string and the unselected text strings based on the number of tokens, the number of root words of the tokens, and the number of synonyms of the tokens. The method can include, for each of the plurality of text strings, dividing, by the asset analysis module, the number of matching tokens by the number of tokens in the first text string to determine an asset mix value for the first text string. The method can include summing, by the asset analysis module, each of the asset mix values for each text string to calculate an overall asset mix value. The method can include determining, by the asset analysis module, a number of categories for each of the plurality of text strings using a category determination model. The method can include summing, by the asset analysis module, the number of categories for each of the plurality of text strings to calculate an overall categorical coverage value. The method can include retrieving, by the asset analysis module, an estimated traffic value for each of the plurality of target keywords. The method can include counting, by the asset analysis module, the number of occurrences of the selected target keyword in each of the plurality of text strings to generate a target keyword count associated with the respective target keyword. The method can include multiplying, by the asset analysis module, each of the target keyword counts with the estimated traffic value of the respective target keyword to calculate a weighted keyword value associated with the respective target keyword. The method can include summing, by the asset analysis module, each of the weighted keyword values to calculate a keyword coverage value. The method can include determining, by an asset scoring module, an overall content item score using a content scoring model, based on the number of text strings, the number of tokens in the text strings, the overall asset mix value, the overall categorical coverage value, and the overall keyword coverage value. The method can include providing, by the asset scoring module to the content provider computing device, the overall content item score associated with the plurality of text strings and the plurality of target keywords.

In some implementations, the method can include identifying, by the asset reception module, if the plurality of text strings exist at a location in the database, wherein the location is determined based on an identifier received from the content provider computing device. In some implementations, the method can include storing, by the asset reception module, the plurality of text strings based on the location in the database responsive to determining the plurality of text strings do not exist in the database at the location.

In some implementations, the method can include storing, by the asset scoring module, the overall content item score in the database. In some implementations, the method can include retrieving, by the asset scoring module, a plurality of overall content item scores from the database. Each of the plurality of overall content item scores can be associated with a plurality of text strings. In some implementations, the method can include sorting, by the asset scoring module, the plurality of overall content item scores to create a sorted list of content item scores. In some implementations, the method can include providing, by the asset scoring module to the content provider computing device, the sorted list of content item scores.

In some implementations, the method can include comparing, by the asset analysis module, the sum of the number of categories for each of the plurality of text strings to a first predefined threshold to create a first relationship. In some implementations, the method can include comparing, by the asset analysis module, the sum of the number of categories for each of the plurality of text strings to a second predefined threshold to create a second relationship. In some implementations, the method can include calculating, by the asset analysis module, the categorical coverage value based on the first relationship and the second relationship.

In some implementations, the method can include receiving, by the asset reception module from the content provider computing device, a target location. In some implementations, the method can include retrieving, by the asset analysis module, a plurality of location keywords associated with the target location. In some implementations, the method can include counting, by the asset analysis module, the number of occurrences of each of the plurality of location keywords in each of the plurality of text strings to generate a location keyword count associated with the respective location keyword. In some implementations, the method can include summing, by the asset analysis module, each of the location keyword counts to calculate a location relevance value. In some implementations, the method can include determining the overall content item score based on the location relevance value.

In some implementations, the method can include receiving, by the asset reception module from the content provider computing device, a first address, the first address associated with a landing page. In some implementations, the method can include accessing, by the asset analysis module, the landing page associated with the first address to retrieve a plurality of landing page tokens. In some implementations, the method can include counting, by the asset analysis module, the number of tokens in the plurality of text strings that match the tokens in the plurality of landing page tokens to determine a landing page relevance value. In some implementations, the method can include determining the overall content item score based on the location relevance value.

In some implementations, the method can include determining, by the asset analysis module, whether the landing page is a home page or a multi-product page. In some implementations, the method can include determining, by the asset analysis module, the landing page relevance value based on the determination that the landing page is a home page or a multi-product page.

At least one other aspect of the present disclosure is directed to a system for assessing content items using numerical criteria, comprising one or more processors. The system can receive, via a network, a plurality of text strings. Each of the plurality of text strings can include a token. The system can receive, via a network, a plurality of target keywords. The system can retrieve one or more synonyms and one or more root words for each token in each of the plurality of text strings from a database. The system can, for each of the plurality of text strings, select a first text string from the plurality of text strings. The system can, for each of the plurality of text strings, determine the number of matching tokens in the first text string and the unselected text strings based on the number of tokens, the number of root words of the tokens, and the number of synonyms of the tokens. The system can, for each of the plurality of text strings, divide the number of matching tokens by the number of tokens in the first text string to determine an asset mix value for the first text string. The system can sum each of the asset mix values for each text string to calculate an overall asset mix value. The system can determine a number of categories for each of the plurality of text strings using a category determination model. The system can sum the number of categories for each of the plurality of text strings to calculate an overall categorical coverage value. The system can retrieve an estimated traffic value for each of the plurality of target keywords. The system can count the number of occurrences of the selected target keyword in each of the plurality of text strings to generate a target keyword count associated with the respective target keyword. The system can multiply each of the target keyword counts with the estimated traffic value of the respective target keyword to calculate a weighted keyword value associated with the respective target keyword. The system can sum each of the weighted keyword values to calculate a keyword coverage value. The system can determine an overall content item score using a content scoring model, based on the number of text strings, the number of tokens in the text strings, the overall asset mix value, the overall categorical coverage value, and the overall keyword coverage value. The system can provide, via a network, the overall content item score associated with the plurality of text strings and the plurality of target keywords.

In some implementations, the system can identify if the plurality of text strings exist at a location in the database, wherein the location is determined based on an identifier received from the content provider computing device. In some implementations, the system can store the plurality of text strings at the location in the database responsive to determining the plurality of text strings do not exist in the database at the location.

In some implementations, the system can store the overall content item score in the database. In some implementations, the system can retrieve a plurality of overall content item scores from the database. Each of the plurality of overall content item scores can be associated with a plurality of text strings. In some implementations, the system can sort the plurality of overall content item scores to create a sorted list of content item scores. In some implementations, the system can include provide, to the content provider computing device, the sorted list of content item scores.

In some implementations, the system can compare the sum of the number of categories for each of the plurality of text strings to a first predefined threshold to create a first relationship. In some implementations, the system can compare the sum of the number of categories for each of the plurality of text strings to a first predefined threshold to create a first relationship. In some implementations, the system can compare the sum of the number of categories for each of the plurality of text strings to a second predefined threshold to create a second relationship. In some implementations, the system can calculate the categorical coverage value based on the first relationship and the second relationship.

In some implementations, the system can receive, via a network, a target location. In some implementations, the system can retrieve a plurality of location keywords associated with the target location from the database. In some implementations, the system can count the number of occurrences of each of the plurality of location keywords in each of the plurality of text strings to generate a location keyword count associated with the respective location keyword. In some implementations, the system can sum each of the location keyword counts to calculate a location relevance value. In some implementations, the system can determine the overall content item score based on the location relevance value.

In some implementations, the system can receive, via a network, a first address, the first address associated with a landing page. In some implementations, the system can access the landing page associated with the first address to retrieve a plurality of landing page tokens. In some implementations, the system can count the number of tokens in the plurality of text strings that match the tokens in the plurality of landing page tokens to determine a landing page relevance value. In some implementations, the system can determine the overall content item score based on the location relevance value.

In some implementations, the system can determine whether the landing page is a home page or a multi-product page. In some implementations, the system can calculate the landing page relevance value based on the determination that the landing page is a home page or a multi-product page. In some implementations, the system can determine a number of categories for each of the plurality of text strings is based on a recurrent neural network model. In some implementations, the system can determine the overall content item score using a content scoring model is based on a linear regression model.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Following below are more detailed descriptions of various concepts related to, and implementations of, methods, apparatuses, and systems of assessing the quality of content items using numerical methods. The various concepts introduced above and discussed in greater detail below may be implemented in any of numerous ways, as the described concepts are not limited to any particular manner of implementation.

Content item providers may serve content items to increase awareness and provide relevant content to users. To ascertain whether the content items properly serve the desired functions, content item providers generally rely on one or more assessments that are determined subsequently to publishing the content items to the users. For example, a click through rate (CTR) is used to assess the quality of a content item. CTR represents the fraction of times a given content item gets "clicked" on when a given content item has been presented to users. This kind of post-published assessment on the quality of content items, however, is an imperfect measure since the content item providers can know the content item quality only after the content items are published, which may take up to days or weeks. Such a delay to assess the content item quality may cause content item providers to spend extra resources to reach the intended purposes.

The present disclosure provides systems and methods for dynamically analyzing and providing the quality of one or more content items at the time, or close to the time, when the one or more content items are created. In some implementations, the one or more content items may be created by at least one data processing system based on a number of assets (e.g., one or more headlines and one or more descriptions, text strings, images, video, etc.), which shall be discussed below. Based on the assets, the data processing system can create one or more content items. Such a creation of content items based on provided assets may be referred to as a responsive search ad (RSA). Further, according to some implementations, concurrently with the content item quality being provided in such real-time fashion, the data processing system can also provide one or more suggestions to the content item providers for modifying the assets being provided. As such, the content item providers can responsively modify content items, if desired, before publishing the content items. Note that in this disclosure text strings may also be referred to as assets, headlines, and descriptions.

Figure 1:
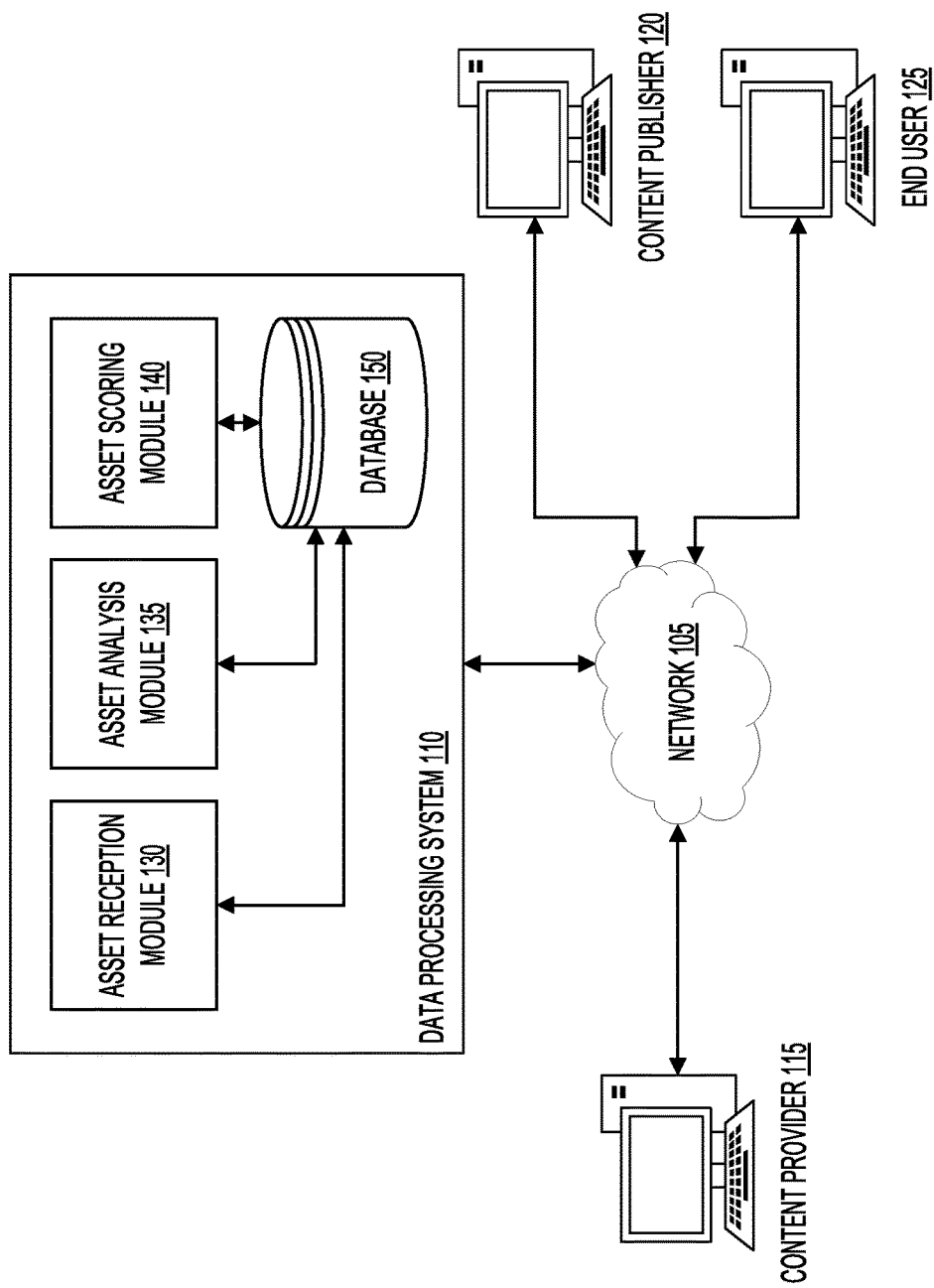
FIG. 1 is a block diagram depicting one implementation of an environment for assessing one or more content items in real-time in a computer network environment, according to an illustrative implementation.

Referring now to FIG. 1, depicted is a system or an environment 100 for assessing one or more content items in real-time in a computer network environment, according to an illustrative implementation. The environment 100 can include at least one computer network 105. The network 105 can be a computer network, which can include one or more local area networks, a wide area network, private networks, public networks, and the Internet. The environment 100 can include at least one content provider 115. The environment 100 can include at least one content publisher. The environment 100 can include at least one end user. The environment 100 can include at least one data processing system 110. The data processing system 110 can include at least one database 150. The database 150 may comprise any computer readable storage media. The data processing system 110 can include at least one asset reception module 130, at least one asset analysis module 135, and at least one asset scoring module 140.

Figure 6:
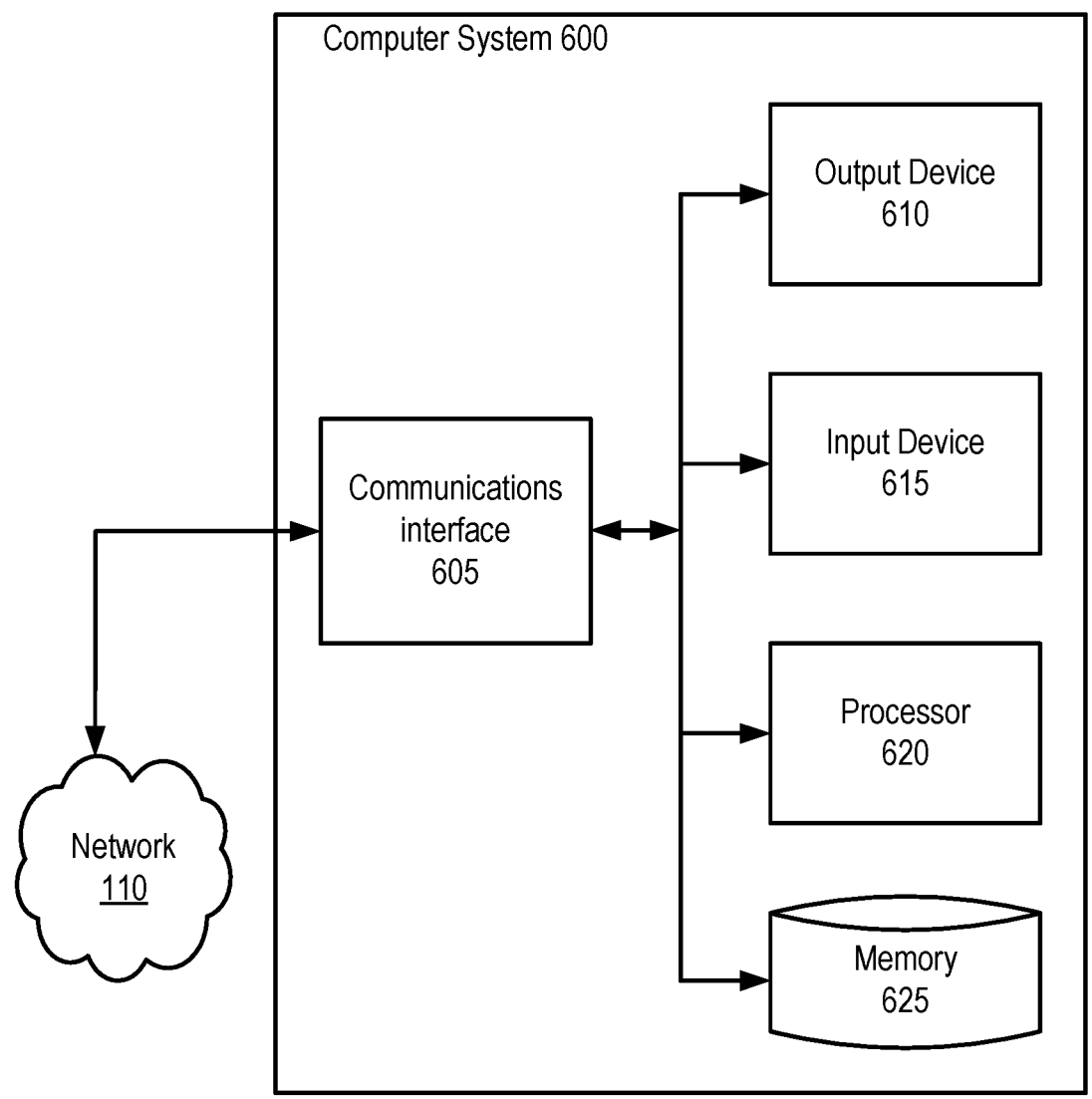
FIG. 6 is a block diagram illustrating a general architecture for a computer system that may be employed to implement elements of the systems and methods described and illustrated herein, according to an illustrative implementation.

Each of the components (e.g., the network 105, the database 150, the asset reception module 130, the asset analysis module 135, and the asset scoring module 140) of the environment 100 can be implemented using the components of a computing system 600 detailed herein in conjunction with FIG. 6. For example, the data processing system 110 can include servers or other computing devices. The content provider computing device 115 can also include servers or other computing devices. The content publisher computing device 120 can also include servers or other computing devices. The end user computing device 125 can also include servers or other computing devices. Each of the components of the data processing system 110 can perform the functionalities detailed herein.

The network 105 can include computer networks such as the Internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one end user computing device 125. The network 105 may be any form of computer network that relays information between the content provider computing device 115, data processing system 110, and one or more content sources, for example, web servers, content item servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 125 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as assets for creating content items for display on information resources at the end user computing device 125. The asset provided by a content provider through the content provider computing device 115 can include third party text-based headlines (e.g., text strings, including one or more tokens) and descriptions (e.g., text strings, including one or more tokens) to create content items for display on information resources provided by the content publisher computing device 120.

In some implementations, the headline provided by a content item provider (e.g., a merchant selling women's shoes) may include one or more of: "STORE," "Fashionable and Comfortable," "Trendsetting Women's Shoes," "Buy Online today," "Free Shipping," "Top Brands at Great Prices," "Official STORE Website," "A Style for Every Occasion," "Buy With Confidence," etc. The descriptions provided by the merchant may include one of more of: "Find all your favorite brands and the latest styles in one place. Don't wait, order today!," "Free shipping on orders over $50. Wide selection of stylish and comfortable shoes," "Stop STORE's wide variety of high quality women's shoes at prices you will love. Buy now!," etc. In some implementations, "STORE" may be used as a keyword. In some implementations, the content item provider can also provide more than one keyword to the data processing system 110.

The above-mentioned information resources can include a website or web page that includes primary content, e.g. content provided by the content publisher computing device 120. The content items can also be displayed on a search results web page. For instance, the content provider computing device 115 can provide or be the source of content items or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items from the content provider computing devices 115. For instance, the content publisher computing device 120 can operate the web site of a company and can provide content about that company for display on web pages of the website. The web pages can include content slots configured for the display of third party content items of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 125, a speaker connected to the user computing device 125, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider can communicate with the data processing system 110 via the content provider computing device 115. In some implementations, the content provider can communicate with the data processing system 110 via a user interface displayed on the user interface devices of the content provider computing device 115.

The data processing system 110 can include at least one server. For instance, the data processing system 110 can include a plurality of servers located in at least one data center or server farm. In some implementations, the data processing system 110 includes a content placement system, e.g., a content item server or content item placement system. The data processing system 110 can include at least one asset reception module 130, at least one asset analysis module 135, at least one asset scoring module 140 and at least one database 150. The asset reception module 130, asset analysis module 135, and asset scoring module 140 each can include at least one processing unit, server, virtual server, circuit, engine, agent, appliance, or other logic device such as programmable logic arrays configured to communicate with the database 150 and with other computing devices (e.g., the content provider computing device 115, the content publisher computing device 120, or the end user computing device 125) via the network 105.

The asset reception module 130, asset analysis module 135, and asset scoring module 140 can include or execute at least one computer program or at least one script. In some implementations, the asset reception module 130, asset analysis module 135, and asset scoring module 140 can be separate components, a single component, or part of the data processing system 110. The asset reception module 130, asset analysis module 135, and asset scoring module 140 can include combinations of software and hardware, such as one or more processors configured to execute one or more scripts to: (a) receive one or more text strings (e.g., headlines and descriptions) for scoring one or more content items; (b) receive one or more target keywords (c) retrieve synonyms and root words (d) calculate an overall asset mix value; (e) calculate an overall categorical coverage; (0 calculate an overall keyword coverage value; (g) determine an overall content item score; and (h) provide overall content item score to the content provider computing device 115.

The data processing system 110 can also include one or more content repositories or databases 150. The databases 150 can be local to the data processing system 110. In some implementations, the databases 150 can be remote to the data processing system 110 but can communicate with the data processing system 110 via the network 105. The databases 150 can include web page, content items, primary video content, a content item campaign manager, content provider feed, third party content, and annotations, among others, to serve to an end user computing device 125.

The asset reception module 130 can receive one or more assets (e.g. text strings) provided by a content provider through the content provider computing device 115. In some implementations, the content provider may provide any number of text-based headlines, which can be between 2 and 15, for example, and any number of text-based descriptions. The headlines and descriptions may appear in any order. In some implementations, the content provider can include at least one of a number of keywords in each of a first subset of the headlines, and not include any of the keywords in each of a second subset of the headlines.

The asset reception module 130 can receive one or more target keywords provided by a content provider through the content provider computing device 115. In some implementations, the content provider may provide any number of target keywords. The target keywords can be any word, phrase, or group of symbols, and can indicate to the asset analysis module 135 the target interaction audiences or text string categories. For example, a target keyword may be "STORE", and the content provider can provide this keyword to the asset reception module 130 to indicate that the text assets are related to a store. In another example, a target keyword may be "FOOD", can indicate that the text assets are related to food. Although the included keywords here have been shown as single words in all capital letters, it should be understood that the target keywords can be any word, phrase, or grouping of symbols readable by a computing device. The asset reception module 130 can receive one or more target locations provided by a content provider through the content provider computing device 115. The asset reception module 130 can receive an address from the content provider computing device 115. The address can correspond to a landing page that is associated with the text strings and target keywords provided by the content provider. The landing page can be a web page.

In response to reception of assets provided by a content provider, the asset reception module 130 may store the assets in the database 150. In the database 150, the asset reception module 130 may sort or group the assets, provided by the content provider, to be associated with an identification of the content provider. As such, once the asset reception module 130 receives any newly provided assets from the content provider 115, the asset reception module 130 can determine whether the newly provided assets have been existing in the database 150 at a location associated with the content provider. In some implementations, the location in the database can be determined based on an identifier associated with the content provider computing device 115. In some implementations, if the newly provided assets have been existing in the database 150, the asset reception module 130 may communicate or otherwise interact with the asset scoring module 140 to retrieve the existing asset score from the database 150; and if the newly provided assets have not been existing in the database 150, the asset reception module 130 may communicate or otherwise interact with the asset analysis module 135 to assess the assets, which shall be discussed below.

The asset analysis module 135 can analyze an asset mix of the assets received by the asset reception module 130. In some implementations, the asset mix of a number of assets can be referred to as a measure of whether the number of assets can reasonably create an ad. Continuing with the above example where the adviser is a merchant selling women's shoes, the asset analysis module 135 may assess the asset mix of a number of assets provided by the merchant by analyzing whether the number of assets are related to one another and/or whether some of the number of assets are duplicative.

The asset analysis module 135 can calculate the asset mix of the assets by determining the number of tokens that are common to the text strings received by the asset reception module 130. It should be noted that the overall asset mix value is calculated from an individual asset mix value of each of the text strings. In some implementations, the asset mix module can compute an asset mix score of each text string, and then aggregate the individual asset mix scores into an overall asset mix value. In some implementations, the asset analysis module 135 can tokenize the text strings. Each token of the text strings can include a word, phrase, or grouping of symbols readable by a computing device. The asset analysis module can also determine synonyms, root words, and contextual information about the tokens in each text string when determining that a token is shared between two text strings. For example, a first text string may contain the token "SHOES", and a second text string may contain the keyword "FOOTWEAR". The asset analysis module can determine that the first and second text string contain a matching token, because the token "SHOES" is very similar to "FOOTWEAR".

The asset analysis module 135 can retrieve one or more synonyms and one or more root words for each token contained in each of the text strings received by the asset reception module 130. The asset analysis module 135 can retrieve the synonyms and root words from the database 150. The asset analysis module 135 can also retrieve the synonyms and root words from the content provider computing device 115. The asset analysis module 135 can also retrieve the synonyms and root words using a lookup table. The asset analysis module 135 can also use a language processing model (e.g., LSTM, recurrent neural network, etc.) to determine the synonyms and root words of each token in each text asset.

In an example case where the content provider computing device 115 provides the assets as "Cookies are yummy" and "Shoes run fast," the asset analysis module 135 may determine that such two assets are not related to each other, and therefore, the asset analysis module 135 may determine an asset mix measure of these two assets as high. In another case where the merchant provides the assets as "Trending shoes" and "Shoes that everyone talks about," the asset analysis module 135 may determine that such two assets are relatively duplicative to each other, and therefore, the asset analysis module 135 may determine an asset mix measure of these two assets as low. In yet another case where the merchant provides the assets as "Fashionable shoes" and "Buy your favorites now," the asset analysis module 135 may determine that such two assets are complementary to one another, and therefore, the asset analysis module 135 may determine an asset mix measure of these two assets as medium to high. Such an asset mix measure may be subsequently used to determine an overall content item score of one or more content items created based on the received assets The asset analysis module 135 can determine an asset mix value for each of the text strings received by the asset reception module 130. To determine the asset mix value for a text string, the asset analysis module 135 can first select a text string. In some implementations, the asset analysis module 135 can compare the selected text string to each of the remaining text strings received by the asset reception module 130. The asset analysis module 135 can compare the selected text string to all other text strings sequentially, one at a time. The asset analysis module 135 can compare the text strings to all other text strings in parallel, or using a combination of sequential processing and parallel processing. The asset reception module 130 can select a second text string from the remaining text strings.

The asset analysis module 135 can determine the number of matching tokens in the first text string and the second text string based on the number of tokens in the first text string, the synonyms of the tokens in each text string, and the root words of the tokens text string. Matching tokens can be tokens that are similar, synonyms, exact matches, or share a root word or meaning. The asset analysis module 135 can determine matching tokens by counting the number of tokens that exactly match in the first text string and the second text string, for example by incrementing a register by one for each exactly matching token. In some implementations, the asset analysis module 135 can increment the register when there is an inexact match between the two tokens of the first text string and the second text string. An inexact match can include two tokens that are synonyms of each other, for example "SHOE" and "FOOTWEAR". In some implementations, the asset analysis module 135 can increment the count by a value that is proportional to the degree of match between two tokens of the first and second text strings. The degree of match between two tokens can be determined by a weight value associated with a synonym of a token. For example, "SHOE" and "FOOTWEAR" are not exact matches. The asset analysis module 135 can retrieve "FOOTWEAR" as a synonym of "SHOE" as described above, and also retrieve a weight value associated with the relationship between the two words. In some implementations, the asset analysis module 135 can increase the count of matching tokens by the weight value to reflect an inexact match between two tokens. The asset analysis module 135 can continue to select a different text string and perform the actions outlined above until the tokens of the first text string have been compared to the tokens of all other text strings received by the asset reception module 130. The asset analysis module 135 can increment or otherwise increase a counter for each of the text strings received by the asset reception module 130. The asset analysis module 135 can also retrieve a weight value from the database 150 that indicates that two tokens are complementary to each other. The asset analysis module 135 can increment the counter associated with a text string by the complementary weight value if it determines that two tokens are complementary to each other. As such, the asset analysis module 135 can provide a larger asset mix value for a text string if its tokens are complementary to the tokens in other text strings. For example, two tokens such as "SHOES" and "FAVORITES" can have a high complementary weight value, and the tokens "SHOES" and "FOOTWEAR" can have a low complementary weight value.

The asset analysis module 135 can divide the number of matching tokens described above by the number of tokens in the first text string to determine an asset mix value for the first text string. In some implementations, the asset analysis module 135 does not divide the number of matching tokens by the number of tokens in the first text string. In some implementations, the asset analysis module 135 can use the number of matching tokens between the first text string and the second text string as the asset mix value of the first text string. Although it has been described above that only a first text string and a second text string are used to compute an asset mix value for the first text string, it should be understood that this process can be repeated by the asset analysis module 135 for each text string received by the asset reception module 130. As such, the asset analysis module 135 can compute an asset mix value for each text string.

The asset analysis module 135 can aggregate the asset mix values of each text string to calculate an overall asset mix value. The overall asset mix value can be a numerical estimation of how diverse, similar, or complementary the text strings are. The asset analysis module 135 can calculate the overall asset mix value by summing each of the asset mix values of each text string. In some implementations, the asset analysis module 135 can calculate the overall asset mix value of the text strings by taking an average of the asset mix values of the text strings. In some implementations, the asset analysis module 135 can calculate the overall asset mix value by inputting the asset mix values of each text string into an asset mix model. The asset mix model can be any type of machine learning model (e.g., deep neural network, recurrent neural network, linear regression, support vector machine, etc.). In some implementations, the asset analysis module 135 can store the overall content item score in the database 150.

The asset analysis module 135 can analyze a categorical coverage of the assets received by the asset reception module 130. In some implementations, the categorical coverage of a number of assets can be referred to as a measure of the quantity of headlines included in the number of assets, diversity of the headlines included in the number of assets, how many asset categories (e.g., brand categories, promotion categories, business information categories, etc.), and/or whether at least two descriptions of the number of assets are distinctive to other assets. The asset analysis module 135 can calculate a categorical coverage value for each text string received by the asset reception module 130. The categorical coverage value can be a measure of how closely a text string reflects a predetermined category.

The asset analysis module 135 can determine a categorical coverage value for each of the text strings received by the asset reception module 130. In some implementations, the categorical coverage value is a measure of the number of categories that are reflected by a text string. In some implementations, the number of possible categories is fixed and predetermined. The categorical coverage value can be a count of how many categories are related to the one or more tokens in a text string. The asset analysis module 135 can determine the categorical coverage value of a text string by inputting the text string into a categorical coverage model. The categorical coverage model can output a number that reflects the number of categories that are reflected by a text string. The categorical coverage model can output a set of numbers that represent each of the categories that are reflected by a text string. The categorical coverage model can be any type of machine learning model (e.g., recurrent neural network, convolutional neural network, deep neural network, linear regression, random forest, etc.). In some implementations, the asset analysis module 135 can determine the categorical coverage value of a text string by inputting a subset of the tokens of the text string into the categorical coverage model.

In some implementations, the asset analysis module 135 may compare the quantity of text strings received by the asset reception module 130 with a predefined number of text strings, e.g., 2. For example, if the asset analysis module 135 has determined that the quantity of the headlines is greater than the predefined number, the asset analysis module 135 may determine a first measure of the categorical coverage as high; and if the asset analysis module 135 has determined that the quantity of the headlines is less than or equal to the predefined number, the asset analysis module 135 may determine the first measure of the categorical coverage as low.

In some implementations, the asset analysis module 135 may compare the diversity of the headlines included in the number of assets. The asset analysis module 135 may predefine a number of text string (e.g. headline) categories. In response to the asset reception module 130 receiving the headlines and communicating with the asset analysis module 135, the asset analysis module 135 may determine the respective headline category of each of the received headlines, and determine how many different headline categories the received headlines are distributed over. If the number of different headline categories is less than a first threshold (e.g., N), the asset analysis module 135 may determine a second measure of the categorical coverage as low; if the number of different headline categories is equal to or greater than the first threshold (e.g., N) and less than a second threshold (e.g., M), the asset analysis module 135 may determine a second measure of the categorical coverage as medium; and if the number of different headline categories is equal to or greater than the second threshold (e.g., M), the asset analysis module 135 may determine the second measure of the categorical coverage as high.

In some implementations, the asset analysis module 135 may determine whether at least two text strings received by the asset reception module 130 are distinctive to (e.g., substantially different from) other text strings, which can include other headline(s) and/or other descriptions(s). For example, a content provider selling women's shoes provides the descriptions as "Find all your favorite brands and the latest styles in one place. Don't wait, order today!" and "Your favorite brands are here. Order today!," the asset analysis module 135 may determine that such two descriptions are relatively duplicative to each other, and therefore, the asset analysis module 135 may determine a third measure of the categorical coverage as low. If the descriptions are provided as "Find all your favorite brands and the latest styles in one place. Don't wait, order today!" and "Free shipping on orders over $50. Wide selection of stylish and comfortable shoes," the asset analysis module 135 may determine that such two descriptions are distinct to each other, and therefore, the asset analysis module 135 may determine the third measure of the categorical coverage as high.

In some implementations, the asset analysis module 135 can aggregate (e.g., average) the measures of the categorical coverage of each text string to estimate an overall measure of the categorical coverage. For example, the asset analysis module 135 can sum each of the categorical coverage values of each text string into an overall categorical coverage value. In some implementations, the asset analysis module 135 can sum each of the categorical coverage values of each text string such that the calculated overall categorical coverage value represents the total number of unique categories reflected by the text strings. In some implementations, the asset analysis module can average each of the categorical coverage values of each text string to calculate an overall categorical coverage value. In some implementations, the asset analysis module 135 can input the categorical coverage values of each text string into an overall categorical coverage model. The overall categorical coverage model can output a value that can be used as the overall categorical coverage of the text strings received by the asset reception module 130. Such an overall measure of the categorical coverage may be subsequently used to estimate an overall content item score of one or more content items created based on the received text strings. In some implementations, the asset analysis module 135 can present the measures of categorical coverage respectively from the overall measure, with the overall measure based on not only the categorical coverage but also other factors such as, for example, character length of text strings or other overall content item quality signals. In some implementations, the asset analysis module 135 can provide estimated measures of categorical coverage and the overall measure for a complete content item before a number and distribution (e.g. minimum headlines and minimum descriptions) of text strings has been provided.

In some implementations, the asset analysis module 135 can compare each of the measures of the categorical coverage value for each of the assets as to a predetermined threshold. For example, the asset analysis module 135 can compare the categorical coverage of a first text string to a first predetermined threshold (e.g., 3 categories), and determine that the categorical coverage of the first text string is greater than the first predetermined threshold. The asset analysis module 135 can compare the categorical coverage of a first text string to a second predetermined threshold (e.g. 10 categories), and determine that the categorical coverage of the first text string is less than the second predetermined threshold. The asset analysis module 135 can calculate and update the keyword coverage value of the first text string based on the relationship to the first predetermined threshold and the relationship to the second predetermined threshold. For example, the categorical coverage value of the first text string may be determined to be "GOOD", or a numerical value that indicates the relationship to the first predetermined threshold or the second predetermined threshold. The asset analysis module 135 can perform these actions for each of the text strings.

The asset analysis module 135 can retrieve an estimated traffic value for each of the keywords received by the asset reception module 130. The estimated traffic values can be retrieved from a database, for example database 150. The estimated traffic values can correspond to the number of interactions expected from a particular keyword if the keyword were used in a content item. In some implementations, the estimated traffic values can correspond to the number of searches for a particular keyword. For example, the click-through rate of content items containing the keyword "DISCOUNT" may be very high. As such, the estimated traffic value of the keyword "DISCOUNT" retrieved from the database will be a larger value than the estimated traffic value of a keyword that does not garner a high click-through rate. In some implementations, the asset analysis module 135 can retrieve the estimated traffic value from the content provider computing device 115. In some implementations, the asset analysis module 135 can retrieve the estimated traffic value from the content publisher computing device 120. In some implementations, the asset analysis module 135 can retrieve the estimated traffic value from one or more end user computing devices 125.

The asset analysis module 135 can analyze a keyword coverage of the text strings received by the asset reception module 130. In some implementations, the keyword coverage of a number of assets can be referred to as a measure of whether or not a selected keyword in the content item group where a content item is being created is also being used by any number or enough of the received text strings. In some implementations, such a measure may be referred to as a keyword coverage measure. As described above, the asset analysis module 135 may aggregate (e.g., average) the asset mix measure, overall measure of the categorical coverage, and keyword coverage measure of the received assets to estimate an overall content item score of one or more content items created based on the received assets. In some implementations, the overall content item score can be categorized into a number of different ranks such as, for example, "INCOMPLETE," "POOR," "AVERAGE," "GOOD", and "EXCELLENT."

The asset analysis module 135 can count the number of occurrences of each target keyword received by the asset reception module 130 in each of the text strings received by the asset reception module 130. Counting the number of occurrences can include determining the number of exact matches in a text string. In some implementations, the asset analysis module 135 can retrieve synonyms and root words for each target keyword from the database 150. The asset analysis module can also retrieve similarity weight values that correspond to the similarity between a keyword and its potential synonyms and/or root words. The asset analysis module 135 can also retrieve the synonyms and/or root words and the associated weight values from a lookup table. The asset analysis module 135 can also retrieve the synonyms and/or root words and their associated weight values from a language processing model. The asset analysis module 135 can increment a counter associated with each target keyword upon determining that the keyword or one of its synonyms or root words is present in a text string. The asset analysis module 135 can scan the tokens of each text string to determine if a target keyword or a similar target keyword is a match. In some implementations, the asset analysis module can increment the associated counter by the similarity weight value determined above. In this way, the counter can reflect the coverage of a target keyword across the text strings received by the asset reception module 130. The number of occurrences of each target keyword can be equal to the counter value associated with the target keyword.

The asset analysis module 135 can multiply the number of occurrences of each target keyword by the estimated traffic value of the respective target keyword to calculate a weighted keyword coverage value for the respective target keyword. The estimated traffic value can be an estimated click-through rate, an estimated factor that reflects the number of interactions with content items including the target keyword, or another factor related to keyword traffic. In some implementations, the estimated traffic value can be an estimated search rate, reflecting the number of times a particular keyword has been searched. The asset analysis module 135 can also determine the weighted keyword value by inputting the estimated traffic value and the number of occurrences of each target keyword into a weighted keyword model. The weighted keyword model can be any type of machine learning model (e.g. neural network, linear regression model, support vector machine, etc.).

The asset analysis module 135 can aggregate each of the weighted keyword values to calculate an overall keyword coverage value of the target keywords and text strings received by the asset reception module 130. In some implementations, the asset analysis module 135 can sum each of the weighted keyword values to calculate the overall keyword coverage value. In some implementations, the asset analysis module 135 can average each of the keyword coverage values to calculate the overall keyword coverage value. In some implementations, the asset analysis module 135 can calculate the overall keyword coverage value by inputting each of the keyword coverage values into an overall keyword coverage model. The overall keyword coverage model can be any machine learning model (e.g., neural network, linear regression, support vector machine, random forest, etc.).

The asset analysis module 135 can retrieve location keywords that are related to the target location provided by the content provider from the database 150. For example, the asset analysis module 135 may access the database using the target location as a key value, and retrieve the data records containing the keywords corresponding to the key value from the database 150. The asset analysis module 135 can also retrieve one or more estimated traffic values for each location keyword retrieved from the database 150. The asset analysis module 135 can count the number of occurrences of each of the location keys in each of the text strings received by the asset reception module 130. The asset analysis module 135 can generate a location keyword count value that corresponds to the number of occurrences of location keywords in the text strings. Counting the number of occurrences can include determining the number of exact matches in a text string. In some implementations, the asset analysis module 135 can retrieve synonyms and root words for each location keyword from the database 150. The asset analysis module can also retrieve similarity weight values that correspond to the similarity between a keyword and its potential synonyms and/or root words. The asset analysis module 135 can also retrieve the synonyms and/or root words and the associated weight values from a lookup table. The asset analysis module 135 can also retrieve the synonyms and/or root words and their associated weight values from a language processing model. The asset analysis module 135 can increment a counter associated with each target keyword upon determining that the keyword or one of its synonyms or root words is present in a text string. The asset analysis module 135 can scan the tokens of each text string to determine if a location keyword or a similar location keyword is a match. In some implementations, the asset analysis module can increment the associated counter by the similarity weight value determined above. In this way, the counter can reflect the coverage of a location keyword across the text strings received by the asset reception module 130.

The asset analysis module 135 can aggregate each of the location keyword counts to calculate location relevance value of the target location and text strings received by the asset reception module 130. In some implementations, the asset analysis module 135 can sum each of the location keyword counts to calculate the location relevance value. In some implementations, the asset analysis module 135 can average each of the location keyword counts to calculate the location relevance value. In some implementations, the asset analysis module 135 can calculate the location relevance value by inputting each of the location keyword counts into a location relevance model. The location relevance model can be any machine learning model (e.g., neural network, linear regression, support vector machine, random forest, etc.).

The asset analysis module 135 can access the landing page associated with the address received by the asset reception module 130. The asset analysis module 135 can determine whether the landing page is a home page or a multi-product page by analyzing the content of the landing page. In some implementations, the content provider can indicate through the content provider computing device that the address points to a home page or a multi-product page or another kind of webpage. The asset analysis module 135 can parse the landing page to determine one or more landing page tokens. The asset analysis module 135 can count the number of matches between the tokens included in the text strings received from the content provider and the landing page tokens to determine a landing page relevance value. In some implementations, the landing page relevance value is equal to the number of token matches between the landing page tokens and the text string tokens. In some implementations, the token matches can be based on similarities and synonyms, as described above in relation to the asset mix value calculations.

The asset scoring module 140 can determine whether at least one content item can be created based on the received text strings. Prior to, simultaneously with, or subsequently to the asset analysis module 135 estimating one or more of the above-described measures, the asset scoring module 140 can combine at least a subset of the text strings to create one or more content items. For example, in response to the asset reception module 130 receiving headlines of "STORE: Widgets," "100s of Options to Choose From," "Lifetime Warranty," and "Free Shipping Orders Over $99" and descriptions of "Made from durable, high quality materials. Customize with any color you need. Trust STORE" and "Your satisfaction is our priority. We offer great prices and no-hassle ordering." from a content provider selling a widget, the asset scoring module 140 can create a content item by combining the headlines of "STORE Widgets" and "Lifetime Warranty" and the description "Made from durable, high quality materials. Customize with any color you need. Trust STORE."

The asset scoring module 140 can also determine an overall content item score based on the number of content items that are created by the asset scoring module 140 using the received assets. For example, if more than a given number (e.g., 3) content items can be created, the asset analysis module 135 may determine that the assets are of an average quality, and if more than another given number (e.g., 8-10) of content items can be created, the asset analysis module 135 may determine that the assets are of a higher quality.

The asset analysis module 135 can provide one or more action items for the one or more created content items to the content provider computing device 115 via the network 105. In some implementations, the asset analysis module 135 can provide one or more action items, in accordance with the measures. For example, if the asset analysis module 135 has determined that the quantity of received text strings is not enough (e.g., below a certain threshold, etc.), the asset analysis module 135 may provide an action item, for example, "Add more headlines." In another example, if the asset analysis module 135 has determined that the received headlines are not distinct enough with respect to one another (e.g., the asset mix value is below a predetermined threshold, etc.), the asset analysis module 135 may provide an action item, for example, "Enter more distinct headlines." In yet another example, if the asset analysis module 135 has determined that the received descriptions are not distinct enough with respect to one another (e.g., the asset mix value is below a predetermined threshold, etc.), the asset analysis module 135 may provide an action item, for example, "Enter more distinct descriptions." In yet another example, if the asset analysis module 135 has determined that the received headline does not include a selected or top keyword (e.g., the keyword coverage measure is below a certain threshold, etc.), the asset analysis module 135 may provide an action item, for example, "Include top keywords in your headlines."

The asset scoring module 140 can determine an overall content item score using a content scoring model. The asset scoring module 140 can determine the overall content item score by inputting any of the number of text strings, the number of tokens in the text strings, the overall asset mix value, the overall categorical coverage value, the location relevance value, landing page relevance value, and the overall keyword coverage value into the content scoring model. In some implementations, the content scoring model can provide four outputs, including "POOR", "FAIR", "GOOD", and "EXCELLENT". In some implementations, the content scoring model is a linear regression model. In some implementations, the content scoring model is a different kind of machine learning model (e.g., neural network, support vector machine, random forest, etc.). In some implementations, the overall content item score is a numerical value. The overall content item score can indicate a relationship between the content items generated by the asset scoring module 140 and the potential click-through rate of the content items. The overall content item score can be an estimated number of interactions with the generated content items. The asset scoring module 140 can calculate, based on the overall content item score, an increase in the number of interactions between a previous overall content item score and the generated overall content item score. In some implementations, the increase in the number of interactions can be a percentage increase (e.g., "55% increase in clicks).

In some implementations, concurrently with the asset scoring module 140 creating one or more content items and prior to providing the content items for display on the end user computing device 125, the asset analysis module 135 can provide the overall content item score of the one or more created content items and the corresponding action items to the content provider computing device 115 via the network 105. In some implementations, the asset analysis module 135 can store respective content item scores of various content items created by different combinations of assets in the database 150. The asset scoring module 140 can provide the overall content item score and corresponding action item(s) for each of the various created content items as a persistent column for display on the content provider computing device 115 via the network 105. In some implementations, the overall content item score and/or corresponding action item(s) can be sorted and filtered by the content item provider and/or the asset scoring module 140. In some implementations, the asset scoring module 140 can provide the increase in the number of interactions determined by the content scoring model. For example, if the content scoring model determines an estimated click-through rate that is greater than a previously calculated click-through rate, the asset scoring module 140 can provide the percentage increase of the click-through rate to the content provider computing device 115.

Figure 2:
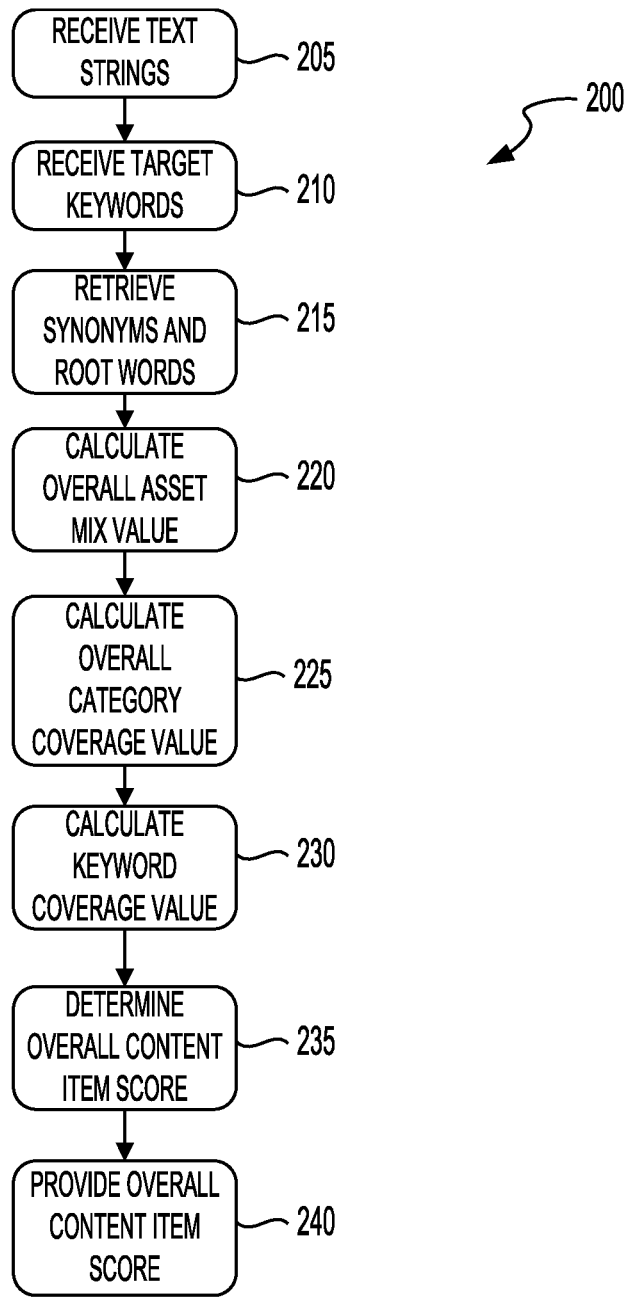
FIG. 2 is a flow diagram of an example method of assessing one or more content items, according to an illustrative implementation.

Referring to FIG. 2, depicted is a flow diagram of a method 200 of assessing one or more text strings based on numerical information. The method 200 can be implemented or performed using the data processing system 110 detailed herein above in conjunction with FIG. 1 or the computer system 600 described herein below in conjunction with FIG. 6. An asset reception module can receive text strings (205). The asset reception module can receive target keywords (210). An asset analysis module can retrieve synonyms and root words (215). The asset analysis module can calculate overall asset mix value (220). The asset analysis module can calculate the overall category coverage value (225). The asset analysis module can calculate the keyword coverage value (230). An asset scoring module can determine the overall content item score (235). The asset scoring module can provide the overall content item score (240).

The asset reception module (e.g. the asset reception module 130) can receive text strings (205). For example, the asset reception module 130 can receive a number of text strings for creating one or more content items. The text strings can include a first number of headlines and a second number of descriptions, each including one or more tokens. In some implementations, the asset reception module 130 can receive the text strings from a content provider computing device (e.g., 115) via a network (e.g., 105). The text strings can also be retrieved from a database, for example database 150.

The asset reception module (e.g. the asset reception module 130) can receive target keywords (210). For example, the asset reception module 130 can receive a number of target keywords that relate to one or more content items. The keywords can include a word, phrase, or any grouping of computer readable symbols. In some implementations, the target keywords can be received from a content provider computing device, for example, content provider computing device 115 via a network (e.g. 105). The target keywords can also be retrieved from a database, for example database 150. The target keywords can also include a target location. The target keywords can also include an address associated with a landing page related to the text strings received in (205).

The asset analysis module (e.g. the asset analysis module 135) can retrieve synonyms and root words (215). For example, the asset analysis module can access a database (e.g., database 150) to retrieve synonyms and root words related to the tokens in the text strings received in (205). The asset analysis module can also tokenize the text string received in (205). The synonyms and/or root words can be retrieved by accessing a lookup table. In some implementations, the synonyms and/or root words can be retrieved by accessing a language processing model (e.g., recurrent neural network, LSTM, etc.).

The asset analysis module (e.g. the asset analysis module 135) can calculate the overall asset mix value (220). For example, the asset analysis module can determine the number of matching tokens across the text string received in (205) to determine an overall asset mix value. In some implementations, the overall asset mix value can be calculated by performing method 300 in conjunction with FIG. 3. In some implementations, the overall asset mix value can be calculated based on the similarity between the text strings based on the synonyms and root words of the tokens included in the text strings.

The asset analysis module (e.g. the asset analysis module 135) can calculate the overall category coverage value (220). In some implementations, the overall category coverage value is proportional to the number of categories that the tokens in the text strings received in (205) are related to. For example, the asset analysis module (e.g., asset analysis module 135) can calculate the category coverage value for each text string using a category coverage model. The asset analysis module can aggregate the category coverage value of each text string into an overall category coverage value. In some implementations, the asset analysis module can calculate the overall category coverage value using method 400 in conjunction with FIG. 4.

The asset analysis module (e.g. the asset analysis module 135) can calculate the keyword coverage value (230). In some implementations, the keyword coverage value is proportional to the number of times the target keywords received in (205) appear as tokens in the text strings (205). For example, the asset analysis module (e.g. the asset analysis module 135) can calculate the keyword coverage value for each target keyword by counting the number of occurrences of each target keyword in the text strings received in (205). The asset analysis module can aggregate the keyword coverage value for each target keyword to create an overall keyword coverage value. In some implementations, the asset analysis module can calculate the overall keyword coverage value using method 500 in conjunction with FIG. 5.

The asset scoring module (e.g. the asset scoring module 140) can determine the overall content item score (235). For example, the asset scoring module can determine the overall content item score by inputting any of the number of text strings, the number of tokens in the text strings, the overall asset mix value, the overall categorical coverage value, the location relevance value, landing page relevance value, and the overall keyword coverage value into a content scoring model. In some implementations, the content scoring model can provide four outputs, including "POOR", "FAIR", "GOOD", and "EXCELLENT". In some implementations, the content scoring model can provide a numerical output. In some implementations, the content scoring model can be a linear regression model. In some implementations, the content scoring model can output a value corresponding to an increase in estimated traffic based on a previous overall content item score.

The asset scoring module (e.g. the asset scoring module 140) can provide the overall content item score (240). For example, the asset scoring module can provide the overall content item score to a content provider (e.g., content provider computing device 115) via a network (e.g. network 105). In some implementations, the asset scoring module can store the overall content item score in a database, for example database 150.

Figure 3:
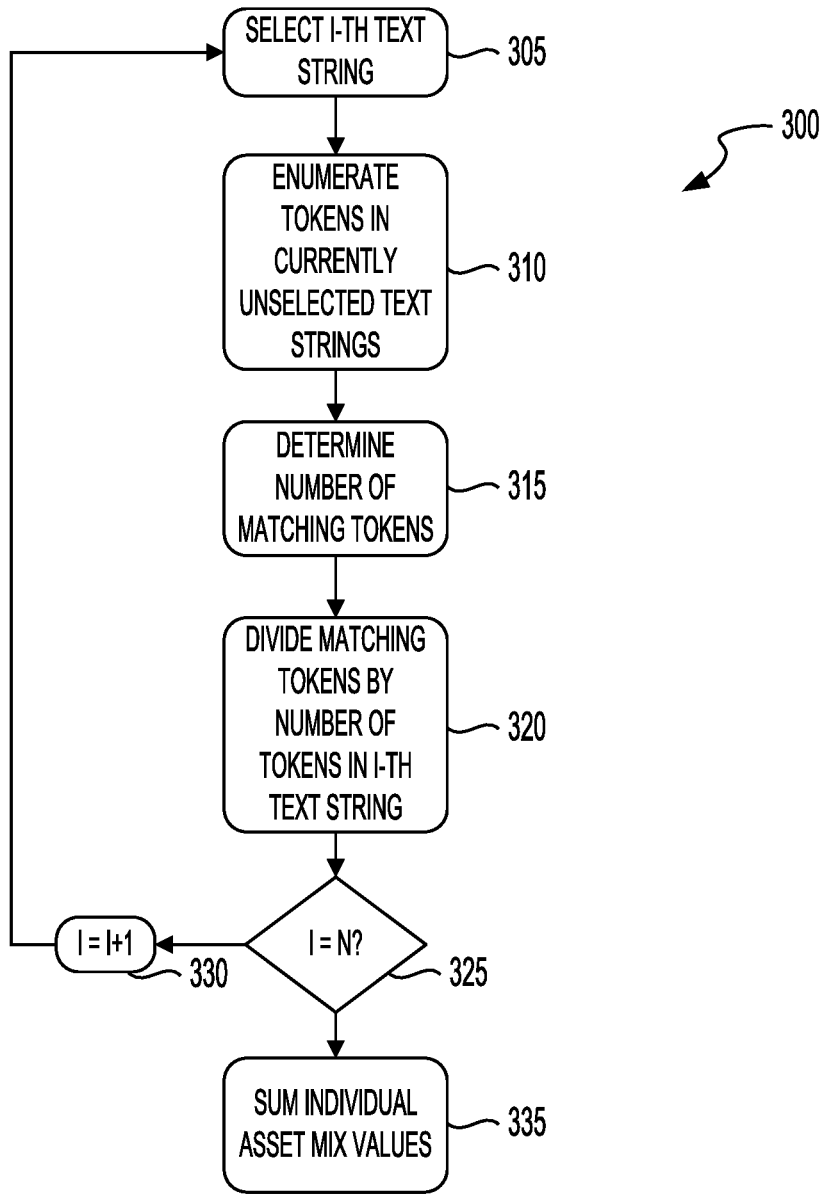
FIG. 3 is a flow diagram of an example method of calculating an overall asset mix value, according to an illustrative implementation.

Now referring to FIG. 3, depicted is a flow diagram of a method 300 of calculating an overall asset mix value. The method 300 can be implemented or performed using the data processing system 110 detailed herein above in conjunction with FIG. 1 or the computer system 600 described herein below in conjunction with FIG. 6. An asset analysis module can select the ith text string (305). The asset analysis module can enumerate the tokens of the currently unselected text strings (310). The asset analysis module can determine the number of matching tokens (315). The asset analysis module can divide matching tokens by the number of tokens in the ith text string (320). The asset analysis module can determine whether all text strings have been compared. The asset analysis module can increment the register i (330). The asset analysis module can sum individual asset mix values (335).

The asset analysis module (e.g. the asset analysis module 135) can select the ith text string (305). For example, the asset analysis module can enumerate N text strings and assign each text string an index value. The asset analysis module can select the text string which has an index value that is equal to a counter register i. In some implementations, on the first iteration of the loop in this method, i can be equal to 1. Selecting a text string can include enumerating the tokens of the text string to create a list of selected tokens. In some implementations, the selected tokens can include words, phrases, or any grouping of computer readable symbols.

The asset analysis module (e.g. the asset analysis module 135) can enumerate the tokens of the currently unselected text strings (310). For example, the asset analysis module can iterate through each of the currently unselected text strings (e.g., all text strings that are not the ith text string) and parse the tokens included in the unselected text strings to create a list of unselected tokens. In some implementations, the unselected tokens can include words, phrases, or any grouping of computer readable symbols.

The asset analysis module (e.g. the asset analysis module 135) can determine the number of matching tokens (315). For example, the asset analysis module can compare each of the tokens in the list of selected tokens with the list of unselected tokens, and determine how many matches occur. In some implementations, matches can be determined based on an exact match, or on a similarity match between synonyms or root words. In some implementations, synonyms and root words can be retrieved from a database, for example database 150. In some implementations, synonyms and root words can be determined based on a language processing model. In some implementations, synonyms and root words have a match weight value. The match weight value can be a number that is less than or equal to one, and is used to count partial matches between two tokens.

The asset analysis module (e.g. the asset analysis module 135) can divide the number of matching tokens by the number of tokens in the ith text string (320) to calculate the asset mix value for the ith text string. For example, if a selected text string has 4 token matches across the unselected text strings, and the selected text string is made of 5 tokens, then the asset mix value of the selected text string is equal to 0.8.

The asset analysis module (e.g. the asset analysis module 135) can determine whether all text strings have been processed (325). In some implementations, the asset analysis module can determine whether all text strings have been processed by comparing the counter register i to the total number of text strings N. If the values match (e.g., i=N), then the method 300 can move to (335) to determine the overall asset mix value. If the values do not match, or not all text strings have been processed, then the method 300 increments the counter register i (330) and selects the next text string in (305).

The asset analysis module (e.g. the asset analysis module 135) can sum the individual asset mix values (335). In some implementations, the asset analysis module can add the asset mix values for each of the text strings together to calculate an overall asset mix value. In some implementations, the asset analysis module can average the asset mix values for each of the text strings to calculate an overall asset mix value. In some implementations, the asset analysis module can input the asset mix values for each of the text strings into an asset mix model to determine the overall asset mix value.

Figure 4:
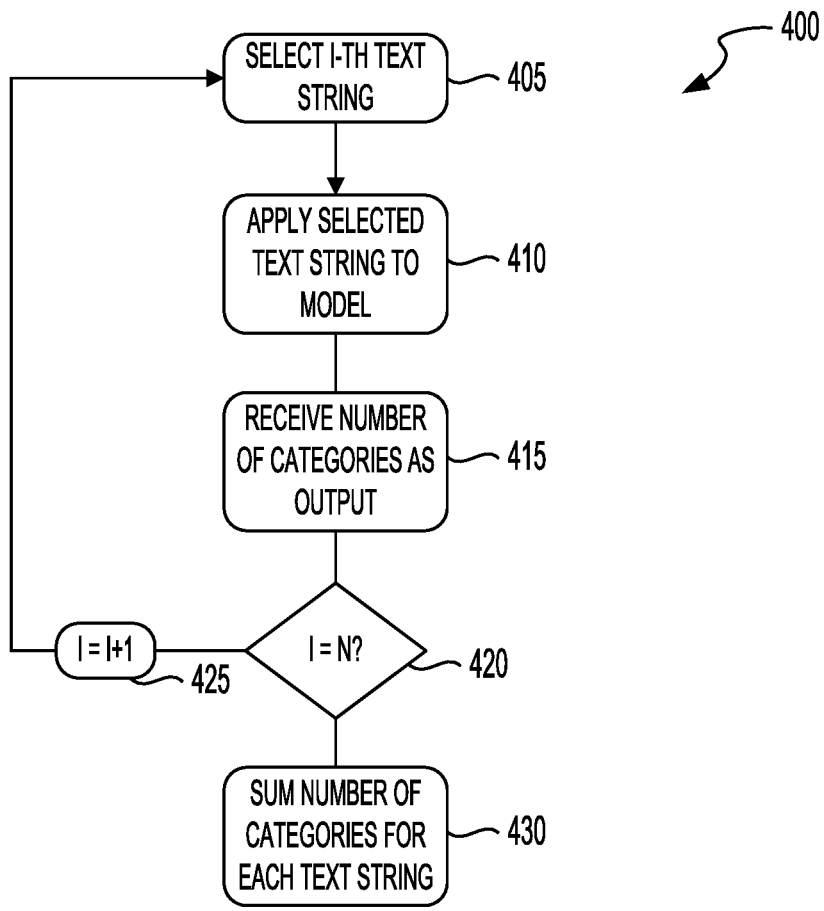
FIG. 4 is a flow diagram of an example method of calculating an overall categorical coverage value, according to an illustrative implementation.

Referring now to FIG. 4, depicted is a flow diagram of a method 400 of calculating an overall categorical coverage value. The method 300 can be implemented or performed using the data processing system 110 detailed herein above in conjunction with FIG. 1 or the computer system 600 described herein below in conjunction with FIG. 6. An asset analysis module can select the ith text string (405). The asset analysis module can apply the selected text string to a category coverage model (410). The asset analysis module can receive the number of categories as output (415). The asset analysis module can compare the counter register i to the number of text strings N to determine whether all text strings have been processed (420). The asset analysis module can increment the counter register i (425). The asset analysis module can sum the category coverage values for each text string (430).

The asset analysis module (e.g., the asset analysis module 135) can select the ith text string (405). For example, the asset analysis module can enumerate N text strings and assign each text string an index value. The asset analysis module can select the text string which has an index value that is equal to a counter register i. In some implementations, on the first iteration of the loop in this method, i can be equal to 1. Selecting a text string can include enumerating the tokens of the text string to create a list of selected tokens. In some implementations, the selected tokens can include words, phrases, or any grouping of computer readable symbols.

The asset analysis module (e.g., the asset analysis module 135) can apply the selected text string to a category coverage model (410). In some implementations, the asset analysis module can apply each token of the selected text string to the model sequentially. In some implementations, the asset analysis module can apply each token of the selected text string to the category coverage model in parallel. In some implementations, the category coverage model is based on a recurrent neural network. In some implementations, the category coverage model is based on any other type of machine learning model (e.g., LSTM, linear regression, etc.).

The asset analysis module (e.g., the asset analysis module 135) can receive the number of categories covered by the selected text string as an output (415). In some implementations, the number of categories is a number between 0 and 15. In some implementations, the output of the category coverage model is one of four signals: "POOR", "FAIR", "GOOD", and "EXCELLENT", where each of the four signals indicate the relative categorical coverage of the selected text string.

The asset analysis module (e.g. the asset analysis module 135) can determine whether all text strings have been processed (420). In some implementations, the asset analysis module can determine whether all text strings have been processed by comparing the counter register i to the total number of text strings N. If the values match (e.g., i=N), then the method 400 can move to (430) to determine the overall asset mix value. If the values do not match, or not all text strings have been processed, then the method 400 increments the counter register i (425) and selects the next text string in (405).

The asset analysis module (e.g. the asset analysis module 135) can sum the individual category coverage values (430). In some implementations, the asset analysis module can add the category coverage values for each of the text strings together to calculate an overall category coverage value. In some implementations, the asset analysis module can sum each of the categorical coverage values of each text string such that the calculated overall categorical coverage value represents the total number of unique categories reflected by the text strings. In some implementations, the asset analysis module can average the category coverage values for each of the text strings to calculate an overall category coverage value. In some implementations, the asset analysis module can input the category coverage values for each of the text strings into a second category coverage model to determine the overall category coverage value.

Figure 5:
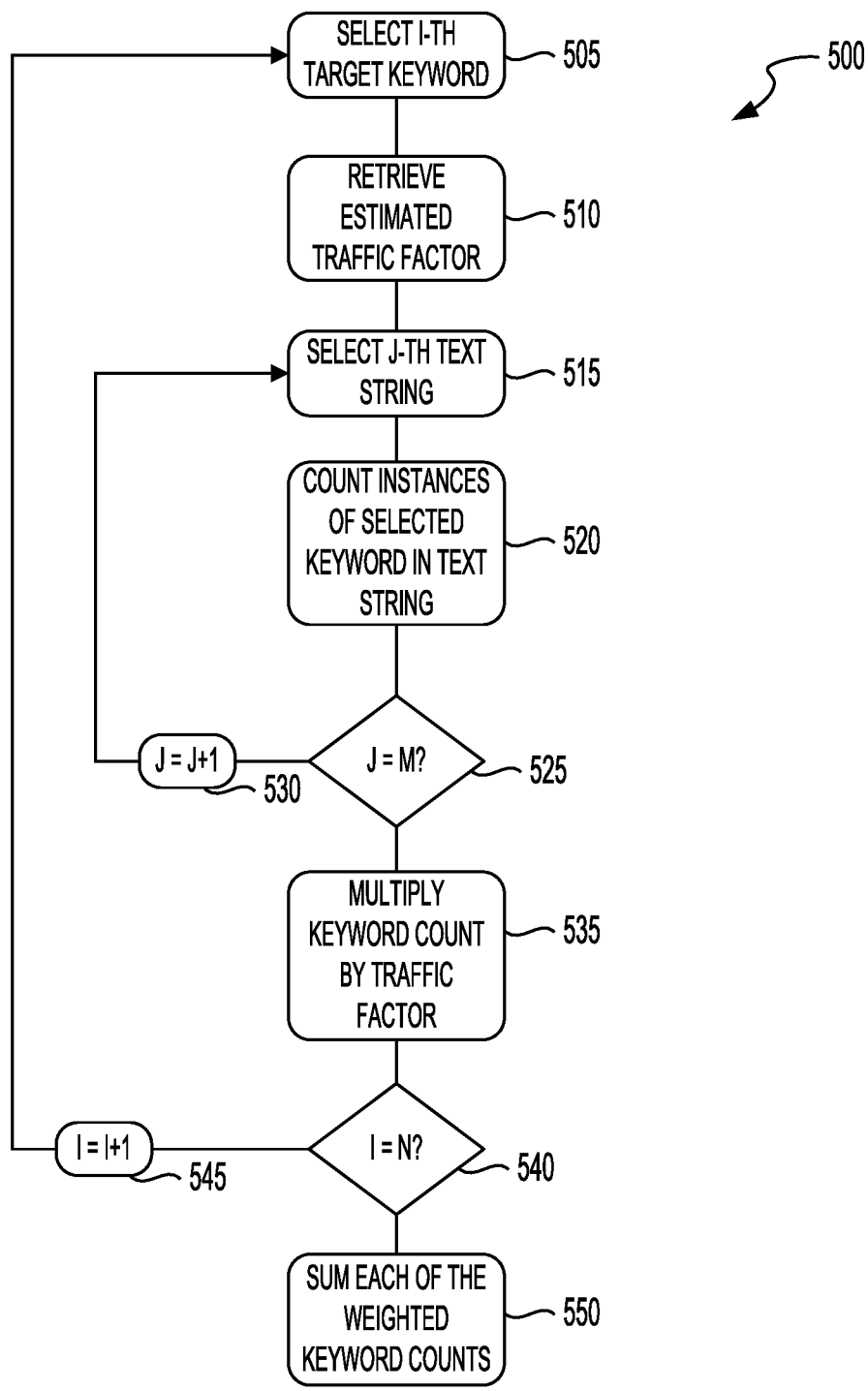
FIG. 5 is a flow diagram of an example method of calculating an overall keyword coverage value, according to an illustrative implementation.

Referring now to FIG. 5, depicted is a flow diagram of a method 500 of calculating an overall keyword coverage value. The method 500 can be implemented or performed using the data processing system 110 detailed herein above in conjunction with FIG. 1 or the computer system 600 described herein below in conjunction with FIG. 6. An asset analysis module can select the ith target keyword (505). The asset analysis module can retrieve an estimated traffic factor for the selected target keyword (510). The asset analysis module can select the jth text string (515). The asset analysis module can count instances of the selected keyword in the text string (520). The asset analysis module can determine if all text strings have been selected (525). The asset analysis module can increment the counter register j. The asset analysis module can multiply the keyword count by the estimated traffic factor (535). The asset analysis module can determine if all target keywords have been selected (540). The asset analysis module can increment the counter register i. The asset analysis module can sum each of the weighted keyword counts (550).

The asset analysis module (e.g., the asset analysis module 135) can select the jth target keyword (505). For example, the asset analysis module can enumerate N target keywords and assign each target keyword an index value. The asset analysis module can select the target keyword which has an index value that is equal to a counter register i. In some implementations, on the first iteration of the loop in this method, i can be equal to 1. In some implementations, the selected target keyword can include words, phrases, or any grouping of computer readable symbols.

The asset analysis module (e.g., the asset analysis module 135) can retrieve the estimated traffic factor associated with the selected target keyword (510). In some implementations, the estimated traffic factor can be a value between 0 and 1. In some implementations, the estimated traffic factor can be a value that corresponds to an estimated click-through rate of a particular keyword when the keyword is included in a content item. In some implementations, the estimated traffic factor can be a value that corresponds to an estimated search rate of a particular keyword. In some implementations, the estimated traffic factor can be retrieved from a database, for example the database 150.

The asset analysis module (e.g., the asset analysis module 135) can select the jth text string (515). For example, the asset analysis module can enumerate M text strings and assign each text string an index value. The asset analysis module can select the text string which has an index value that is equal to a counter register j. In some implementations, on the first iteration of the loop, j can be equal to 1. Selecting a text string can include enumerating the tokens of the text string to create a list of selected tokens. In some implementations, the selected tokens can include words, phrases, or any grouping of computer readable symbols.

The asset analysis module (e.g., the asset analysis module 135) can count the instances of the selected keyword in the select text string (520). For example, if the selected keyword appears in the selected text string twice, the asset analysis module can increment a counter associated with the selected keyword by two. In some implementations, the asset analysis module can retrieve one or more synonyms or root words of the target keyword from a database, for example database 150. The synonyms or root words can include a similarity weight value. In some implementations, if the asset analysis module determines that a synonym or root word is present in the selected text string, the asset analysis module can increment the counter associated with the target keyword by the similarity weight value associated with the synonym or root word.

The asset analysis module (e.g. the asset analysis module 135) can determine whether all text strings have been processed (525). In some implementations, the asset analysis module can determine whether all text strings have been processed by comparing the counter register j to the total number of text strings M If the values match (e.g., j=M), then the method 500 can move to (535). If the values do not match, or not all text strings have been processed, then the method 500 increments the counter register j (530) and selects the next text string in (515).

The asset analysis module (e.g. the asset analysis module 135) can multiply the keyword count value with the estimated traffic factor associated with the target keyword (535) to calculate a weighted keyword value for the selected target keyword. In some implementations, the multiplication applies a weight to the keyword that is proportional to the estimated traffic of the keyword. In some implementations, the asset analysis module does not multiply the keyword count by the estimated traffic value.

The asset analysis module (e.g. the asset analysis module 135) can determine whether all target keywords have been processed (540). In some implementations, the asset analysis module can determine whether all target keywords have been processed by comparing the counter register i to the total number of text strings N. If the values match (e.g., i=N), then the method 500 can move to (550). If the values do not match, or not all target keywords have been processed, then the method 500 increments the counter register i (545) and selects the next target keyword in (505).

The asset analysis module (e.g. the asset analysis module 135) can sum the weighted keyword coverage values (550). In some implementations, the asset analysis module can add the weighted keyword coverage values for each of the target keywords together to calculate an overall keyword coverage value. In some implementations, the asset analysis module can average the weighted keyword coverage values for each of the target keywords to calculate an overall weighted keyword coverage value. In some implementations, the asset analysis module can input the weighted keyword coverage values for each of the target keywords into a keyword coverage model to determine the overall keyword coverage value.

Now referring to FIG. 6, depicted is the general architecture of an illustrative computer system 600 that may be employed to implement any of the computer systems discussed herein (including the data processing system 110 and its components such as the various modules 130-140) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the various modules 130-140.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 150. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the computer system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The modules 130-140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or data processing system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the modules 130-140 can be part of the data processing system 110, a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim element.

The invention claimed is:

1. A method for assessing content items using numerical criteria comprising:
    receiving, by an asset reception module, a plurality of text strings, each of the plurality of text strings comprising a token;
    receiving, by the asset reception module, a plurality of target keywords;
    retrieving, by an asset analysis module, one or more synonyms and one or more root words for each token in each of the plurality of text strings from a database;
    for each of the plurality of text strings:
        selecting, by the asset analysis module, a first text string from the plurality of text strings;
        determining, by the asset analysis module, the number of matching tokens in the first text string and the unselected text strings based on the number of tokens, the number of root words of the tokens, and the number of synonyms of the tokens;
        dividing, by the asset analysis module, the number of matching tokens by the number of tokens in the first text string to determine an asset mix value for the first text string;

summing, by the asset analysis module, each of the asset mix values for each text string to calculate an overall asset mix value;

determining, by the asset analysis module, a number of categories for each of the plurality of text strings using a category determination model;

summing, by the asset analysis module, the number of categories for each of the plurality of text strings to calculate an overall categorical coverage value;

retrieving, by the asset analysis module, an estimated traffic value for each of the plurality of target keywords;

counting, by the asset analysis module, the number of occurrences of the selected target keyword in each of the plurality of text strings to generate a target keyword count associated with the respective target keyword;

multiplying, by the asset analysis module, each of the target keyword counts with the estimated traffic value of the respective target keyword to calculate a weighted keyword value associated with the respective target keyword;

summing, by the asset analysis module, each of the weighted keyword values to calculate a keyword coverage value;

determining, by an asset scoring module, an overall content item score using a content scoring model, based on the number of text strings, the number of tokens in the text strings, the overall asset mix value, the overall categorical coverage value, and the overall keyword coverage value; and providing, by the asset scoring module to the content provider computing device, the overall content item score associated with the plurality of text strings and the plurality of target keywords.

2. The method of claim 1, further comprising:
identifying, by the asset reception module, if the plurality of text strings exist at a location in the database, wherein the location is determined based on an identifier received from the content provider computing device; and storing, by the asset reception module, the plurality of text strings at the location in the database responsive to determining the plurality of text strings do not exist in the database based on the location.

3. The method of claim 2, further comprising:
storing, by the asset scoring module, the overall content item score in the database;

retrieving, by the asset scoring module, a plurality of overall content item scores from the database, each of the overall content item scores associated with a plurality of text strings;

sorting, by the asset scoring module, the plurality of overall content item scores to create a sorted list of content item scores;

providing, by the asset scoring module to the content provider computing device, the sorted list of content item scores.

4. The method of claim 1, wherein summing the number of categories for each of the plurality of text strings to calculate an overall categorical coverage value further comprises:
comparing, by the asset analysis module, the sum of the number of categories for each of the plurality of text strings to a first predefined threshold to create a first relationship;

comparing, by the asset analysis module, the sum of the number of categories for each of the plurality of text strings to a second predefined threshold to create a second relationship; and calculating, by the asset analysis module, the categorical coverage value based on the first relationship and the second relationship.

5. The method of claim 1, summing each of the weighted keyword values to calculate the keyword coverage value further comprises:
receiving, by the asset reception module from the content provider computing device, a target location;

retrieving, by the asset analysis module, a plurality of location keywords associated with the target location;

counting, by the asset analysis module, the number of occurrences of each of the plurality of location keywords in each of the plurality of text strings to generate a location keyword count associated with the respective location keyword; and summing, by the asset analysis module, each of the location keyword counts to calculate a location relevance value.

6. The method of claim 5, wherein determining the overall content item score is based on the location relevance value.

7. The method of claim 1, further comprising:
receiving, by the asset reception module from the content provider computing device, a first address, the first address associated with a landing page;

accessing, by the asset analysis module, the landing page associated with the first address to retrieve a plurality of landing page tokens; and counting, by the asset analysis module, the number of tokens in the plurality of text strings that match the tokens in the plurality of landing page tokens to determine a landing page relevance value.

8. The method of claim 7, wherein determining the overall content item score is based on the landing page relevance value.

9. The method of claim 7, wherein determining the landing page relevance value further comprises:
determining, by the asset analysis module, whether the landing page is a home page or a multi-product page; and determining, by the asset analysis module, the landing page relevance value based on the determination that the landing page is a home page or a multi-product page.

10. The method of claim 1, wherein:
determining, the asset analysis module, a number of categories for each of the plurality of text strings is based on a recurrent neural network model; and determining, the asset analysis module, the overall content item score using a content scoring model is based on a linear regression model.

11. A system of one or more processors, the processors configured to:
receive, via a network, a plurality of text strings, each of the plurality of text strings comprising a token;

receive, via a network, a plurality of target keywords;

retrieve one or more synonyms and one or more root words for each token in each of the plurality of text strings from a database;

for each of the plurality of text strings:
select a first text string from the plurality of text strings;
determine the number of matching tokens in the first text string and the unselected text strings based on the number of tokens, the number of root words of the tokens, and the number of synonyms of the tokens;

divide the number of matching tokens by the number of tokens in the first text string to determine an asset mix value for the first text string;

sum each of the asset mix values for each text string to calculate an overall asset mix value;

determine a number of categories for each of the plurality of text strings using a category determination model;

sum the number of categories for each of the plurality of text strings to calculate an overall categorical coverage value;

retrieve an estimated traffic value for each of the plurality of target keywords;

count the number of occurrences of the selected target keyword in each of the plurality of text strings to generate a target keyword count associated with the respective target keyword;

multiply each of the target keyword counts with the estimated traffic value of the respective target keyword to calculate a weighted keyword value associated with the respective target keyword;

sum each of the weighted keyword values to calculate a keyword coverage value;

determine an overall content item score using a content scoring model, based on the number of text strings, the number of tokens in the text strings, the overall asset mix value, the overall categorical coverage value, and the overall keyword coverage value; and provide, via a network, the overall content item score associated with the plurality of text strings and the plurality of target keywords.

12. The system of claim 11, further configured to:
identify if the plurality of text strings exist at a location in the database, wherein the location is determined based on an identifier received from the content provider computing device; and store the plurality of text strings at the location in the database responsive to determining the plurality of text strings do not exist in the database at the location.

13. The system of claim 12, further configured to:
store the overall content item score in at the location in the database;

retrieve a plurality of overall content item scores from the database, each of the plurality of overall content item scores associated with a plurality of text strings;

sort the plurality of overall content item scores to create a sorted list of content item scores;

provide, to the content provider computing device, the sorted list of content item scores.

14. The system of claim 11, further configured to:
compare the sum of the number of categories for each of the plurality of text strings to a first predefined threshold to create a first relationship;

compare the sum of the number of categories for each of the plurality of text strings to a second predefined threshold to create a second relationship; and calculate the categorical coverage value based on the first relationship and the second relationship.

15. The system of claim 11, further configured to:
receive, via a network, a target location;
retrieve a plurality of location keywords associated with the target location from the database;
count the number of occurrences of each of the plurality of location keywords in each of the plurality of text strings to generate a location keyword count associated with the respective location keyword; and
sum each of the location keyword counts to calculate a location relevance value.

16. The system of claim 15, further configured to:
determine the overall content item score based on the location relevance value.

17. The system of claim 11, further configured to:
receive, via a network, a first address, the first address associated with a landing page;
access the landing page associated with the first address to retrieve a plurality of landing page tokens; and
count the number of tokens in the plurality of text strings that match the tokens in the plurality of landing page tokens to determine a landing page relevance value.

18. The system of claim 17, further configured to:
determine the overall content item score based on the location relevance value.

19. The system of claim 17, further configured to:
determine whether the landing page is a home page or a multi-product page; and
calculate the landing page relevance value based on the determination that the landing page is a home page or a multi-product page.

20. The system of claim 11, further configured to:
determine a number of categories for each of the plurality of text strings is based on a recurrent neural network model; and
determine the overall content item score using a content scoring model is based on a linear regression model.

* * * * *